No. 854,424. PATENTED MAY 21, 1907.
M. KETTERER.
ATTACHMENT FOR LAWN MOWERS.
APPLICATION FILED AUG. 22, 1904.
2 SHEETS—SHEET 2.
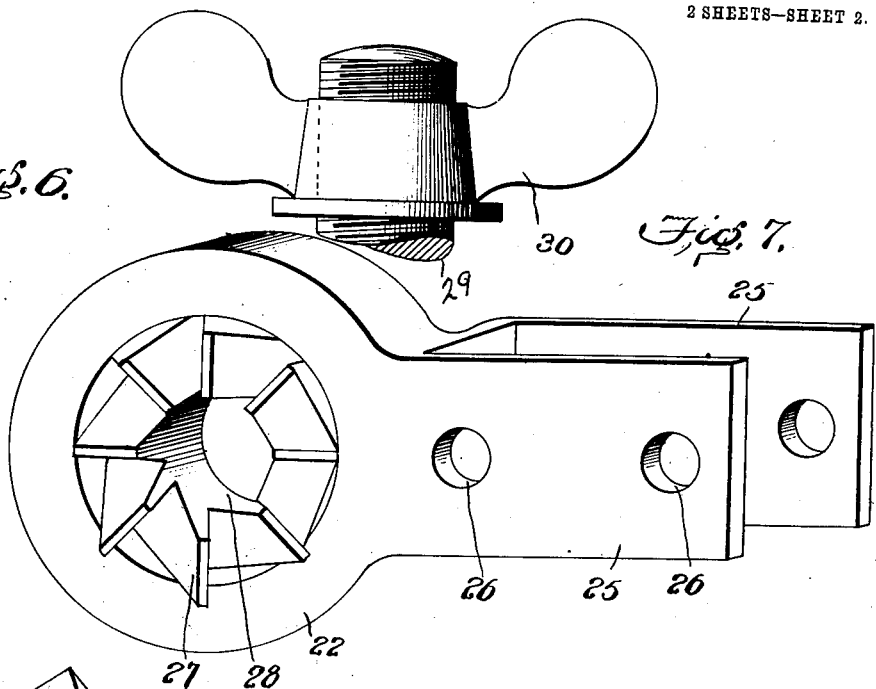
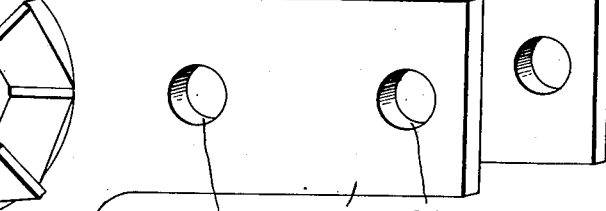
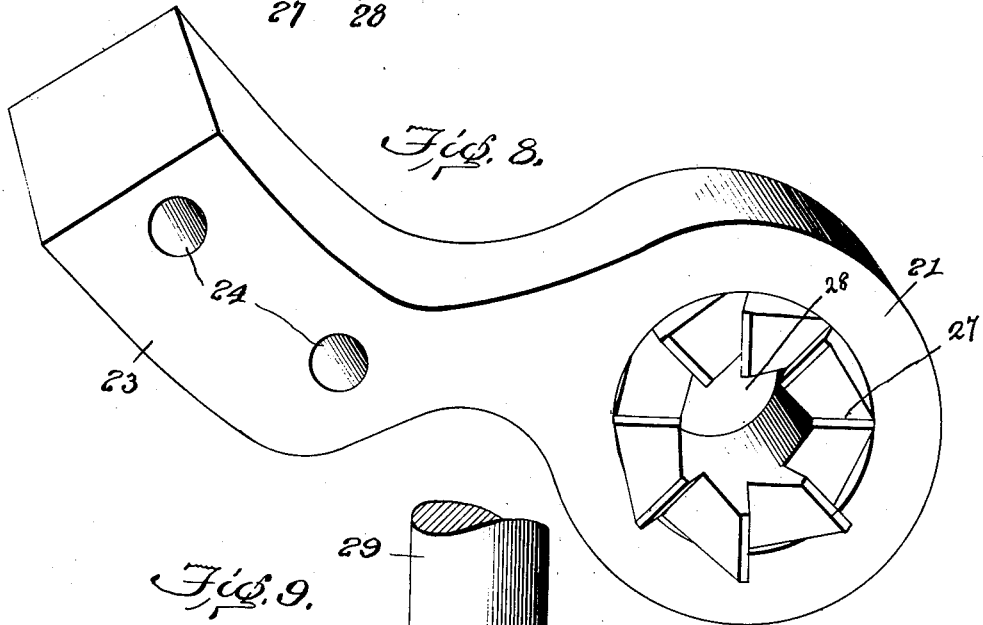
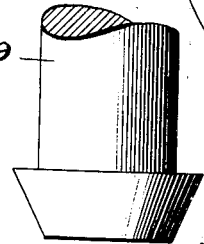
Witnesses
E. Howard Walmsley.
Irvine Miller.
Inventor
Max Ketterer,
By H. A. Toulmin.
Attorney

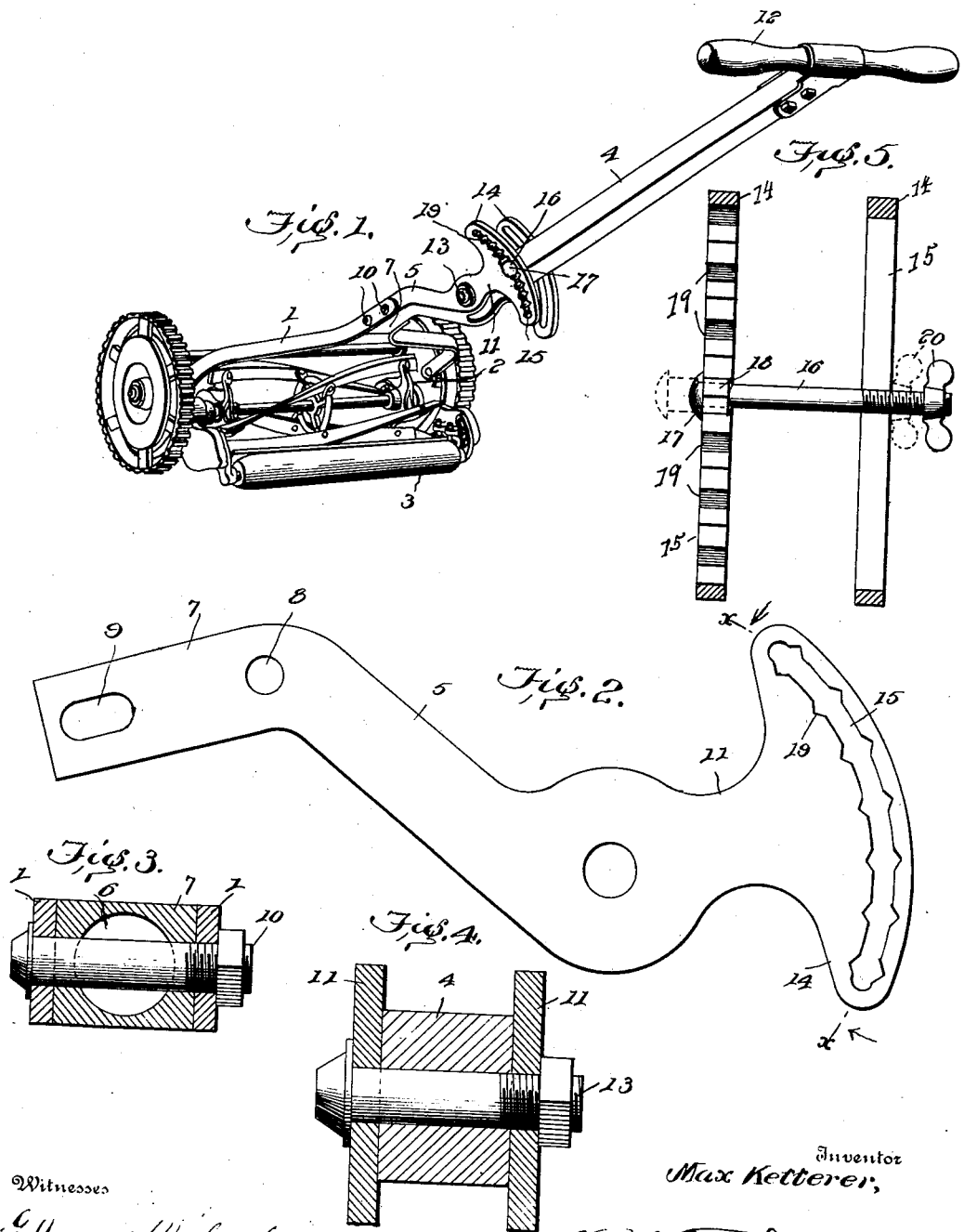

UNITED STATES PATENT OFFICE.

MAX KETTERER, OF SPRINGFIELD, OHIO.

ATTACHMENT FOR LAWN-MOWERS.

No. 854,424.　　　Specification of Letters Patent.　　　Patented May 21, 1907.

Application filed August 22, 1904. Serial No. 221,618.

*To all whom it may concern:*

Be it known that I, MAX KETTERER, a citizen of the United States, residing at Springfield, in the county of Clark and State of Ohio, have invented certain new and useful Improvements in Attachments for Lawn-Mowers, of which the following is a specification, reference being had therein to the accompanying drawings.

This invention relates to attachments for lawn-mowers and has for its object to provide a construction which is readily applicable to lawn-mowers already constructed or in use, by means of which attachment the handle of the mower, which is usually rigidly connected to the bail, may be given a pivotal relation to said bail, so as to be free to move relatively to the same, or may be adjusted so as to assume any desired angle relatively to said bail.

To these ends my invention consists in certain novel features which I will now proceed to describe, and will then particularly point out in the claims.

In the accompanying drawings, Figure 1 is a perspective view of a lawn-mower having my improvement attached thereto; Fig. 2 is a side elevation of the body of the attachment in the form shown in Fig. 1; Fig. 3 is a detail sectional view, illustrating the connection between the attachment and bail; Fig. 4 is a similar view, illustrating the connection between the attachment and the front end of the handle; Fig. 5 is a sectional view, taken on the line $x\ x$ of Fig. 2, and looking in the direction of the arrows, with the adjusting bolt in position; and Figs. 6 to 9 inclusive are views of a modified structure embodying my invention, the parts being separated and broken away, and partly shown in perspective.

In lawn-mowers as now constructed, the driving force is applied thereto by means of a bail 1, pivoted to the frame of the mower and having its downward and rearward movement limited by a stop 2, so as to permit pressure to be brought on the roller 3 when the handle is depressed, the handle, indicated by the reference numeral 4, being rigidly attached to the bail. This construction presents certain disadvantages, the chief of which is that it is impossible to mow an inclined surface, such as the slope of a bank or terrace, from above, and it becomes necessary to push the mower up the slope to cut the same. I overcome this disadvantage by means of an attachment which may be applied to the mower, being interposed between the bail and handle, and permitting the handle to have a pivotal relation with the bail, or to be adjusted to any angle thereto. In the embodiment of my invention shown in Figs. 1 to 5 inclusive, the attachment comprises a body 5, preferably hollow or cored out for lightness, as indicated at 6. One end of said body is bent or inclined at an angle, being indicated by the numeral 7, and has transverse apertures 8 and 9, one or both of which may be slotted. This end of the device is placed between the ends of the bail, in the position ordinarily occupied by the end of the handle, and is secured in position by the bolts 10 ordinarily used to fasten the handle. The slotting of the bolt holes permits the device to adjust itself to different makes of mowers. At the other end of the body 5 there are located cheek plates 11, adapted to receive between them the forward end of the handle 4. It will be observed that the central portion of the body 5 is so bent or inclined relatively to its end portions as to compensate for the increased distance which it adds between the mower and handhold or cross-bar 12 of the handle, thus bringing this latter downward below the point where it would be located if the connecting device were straight. The front end of the handle fits between the cheek plates 11 and is connected thereto at its forward end by a pivot bolt 13. The rear ends of the cheek plates are formed into heads 14, extending transversely of the handle 4, and these heads are provided with slots 15 to receive a clamping bolt 16 by means of which the handle may be secured in any desired angular relation to the body 5. To securely lock the parts, the bolt 16 is provided at one end with a head 17 and an enlargement 18, square in cross section, between said head and the round body of the bolt. The slots 15 are of a width about equal to the diameter of the body of the bolt, and one of said slots is provided with notches 19 at intervals, which notches fit the square portion 18 of the bolt. 20 indicates a nut on the end of the bolt opposite the head. This bolt passes through an aperture in the handle 4, and it will be seen that when the nut 20 is unscrewed to the position shown in full lines in Fig. 5, the nut and bolt may be moved laterally to the position shown in dotted lines in said figure, whereupon the handle may be turned freely upon the pivot bolt 13, and may be adjusted to any desired position. When so adjusted, the parts may be firmly locked by screwing up the nut 20, thus drawing the square portion 18 of the bolt into engagement with the notches 19 and preventing movement of the bolt and handle around the pivot bolt 13.

When this attachment is applied to a lawn-mower, the handle 4 may be either left loosely connected to the bail by leaving it free to turn on the pivot bolt 13, or it may be adjusted at a suitable angle to said bail, and in either case the angular relations of the handle and mower will be such as to permit the mower to be used for cutting sloping surfaces downward. The device may be readily applied to mowers already in use or already constructed.

It is obvious that the structure may be modified without departing from the principle of my invention. For instance, in Fig. 6 I have shown the attachment as comprising two disk-like members or heads, 21 and 22. The former has a shank 23 with bolt holes 24, by means of which it may be secured between the ends of the bail, while the latter has side plates 25 to receive the end of the handle, and bolt holes 26 by which it may be secured thereto. Each of the members is provided with an annular row of ratchet teeth 27, adapted to engage each other, said teeth surrounding an aperture 28, and when the heads are brought together, a combined pivot and clamping bolt 29 passes through said apertures and is provided with a clamping nut 30, by means of which the heads may be clamped in any position to which they may be adjusted, being held in such adjusted position by the engagement of the ratchet teeth. By this construction the handle may be adjusted to any desired angle with relation to the bail.

Other modifications will readily suggest themselves, and I therefore do not wish to be understood as limiting myself to the precise details of construction hereinbefore described and illustrated in the accompanying drawings, as the same may be modified without departing from the principle of my invention.

Having thus fully described my invention, what I claim as new and desire to secure by Letters Patent is:—

1. The combination, with a lawn mower, a bail and a handle located in proximity thereto, of mechanism interposed between said bail and said handle and adapted to connect the one to the other, said mechanism comprising a body, means at one end thereof for securing said body to the bail and means at the opposite end thereof for securing the same to the handle, one of said points of connection being pivotal to permit variations of the angular position of the handle relatively to the bail, substantially as described.

2. The combination, with a lawn mower, a bail and a handle located in proximity thereto, of mechanism interposed between said bail and said handle and adapted to connect the one to the other, said mechanism comprising a body, means at one end thereof for securing said body to the bail, means at the opposite end thereof for securing the same to the handle, one of said points of connection being pivotal to permit variations of the angular position of the handle relatively to the bail, and means combined with the pivotal connection for securing the parts in such different angular positions, substantially as described.

3. The combination, with a lawn mower, a bail, and a handle, of an attachment comprising a body, means at one end thereof for connecting the same to the extremities of the bail, cheek plates at the opposite end of said body adapted to receive said handle and having slots therein, a pivot bolt for securing the handle between said cheek plates, and clamping devices to secure said handle in different positions along said slot, substantially as described.

In testimony whereof, I affix my signature in presence of two witnesses.

MAX KETTERER.

Witnesses:
E. O. HAGAN,
IRVINE MILLER.